United States Patent [19]
Brian et al.

[11] Patent Number: 5,548,345
[45] Date of Patent: Aug. 20, 1996

[54] VIDEO VIEWING CENSORING SUPERVISION SYSTEM

[75] Inventors: James M. Brian, Marina del Rey; Joseph N. Jackson, Hawthorne, both of Calif.

[73] Assignee: Protelcon, Inc., Califon, N.J.

[21] Appl. No.: 369,001

[22] Filed: Jan. 5, 1995

[51] Int. Cl.⁶ .................................................. V04N 5/44
[52] U.S. Cl. .......................... 348/734; 348/5.5; 348/725; 348/906; 345/146; 380/23
[58] Field of Search .................... 348/5.5, 731, 468, 348/734, 906, 569, 570, 725; 380/20, 23; 455/26.1, 4.2; 348/725; 345/113, 114, 115, 146, 173; 395/151, 156; H04N 5/44

[56] References Cited

U.S. PATENT DOCUMENTS

| | | | |
|---|---|---|---|
| 4,081,754 | 3/1978 | Jackson | 340/147 |
| 4,228,543 | 10/1980 | Jackson | 455/181 |
| 4,620,229 | 10/1986 | Amano et al. | 348/734 |
| 5,001,554 | 3/1991 | Johnson et al. | 348/5.5 |
| 5,168,372 | 12/1992 | Sweetser | 348/5.5 |
| 5,373,324 | 12/1994 | Kuroda et al. | 345/146 |
| 5,382,983 | 1/1995 | Kwoh et al. | 348/5.5 |

Primary Examiner—Safet Metjahic
Assistant Examiner—Jeffrey S. Murrell
Attorney, Agent, or Firm—Blakely, Sokoloff, Taylor & Zafman

[57] ABSTRACT

A TV/video viewing supervision system that enables a supervisor, typically a parent controlling children's viewing, to selectably preprogram the hours, programs and/or channels of television, VCR, cable TV, satellite TV and/or game viewing that are allowed and/or blocked from viewing. The system features a channel/time matrix that can be programmed with a keypad-controlled cursor of a hand-held remote unit to set up a viewing schedule for future time period, for example a coming week.

11 Claims, 15 Drawing Sheets

CONFIGURATION SETUP

TIME: 11 : 23 am
DATE: 08 / 07 / 93
INPUT: STD CABLE

FIG. 6b

VIDEO VIEWING CENSORING SUPERVISION SYSTEM

BACKGROUND OF THE INVENTION (1) Field of the Invention

The present invention relates to the field of home video entertainment and more particularly it is directed to systems for controlling the viewing of television receivers and associated equipment such as but not confined to cable boxes, satellite boxes, VCRs and video games.

(2) Prior Art

It is becoming increasingly important to control the television and video viewing of children on an ongoing basis, especially at times when personal supervision cannot be provided. Ideally there should be agreed upon ground rules about which channels can be watched, at what time, on what days, and how much total viewing is allowed per day, per week or per month. Even with such agreement, effective management and enforcement becomes a formidable problem for busy working parents, and too often excessive viewing tends to get out of hand and become increasingly unmanageable.

Programmable television receiver controllers were disclosed by one of the present inventors, J. N. Jackson in U.S. Pat. Nos. 4,081,754 and 4,228,543 wherein a digital control clock selects pre-entered information regarding selection or blocking of particular channels at particular time intervals presettable in half hour steps throughout a predetermined period such as a one week time period. The '754 patent comprises random access memory means, control and data lines, clock means, control means, first and second program means and channel selection entry means. The '543 patent comprises random access memory means, storing means, read means and control means for controlling a television receiver according to data read from the memory means.

Within the subcategory of U.S. prior art patents that teach control of viewing time without regard to different channels, one subcategory, exemplified by U.S. Pat. Nos. 5,060,079 and 4,348,696 to Beierto Rufus-Isaacs, monitors or records time used from a total time allotment and gives indication of remaining time. Another subcategory, exemplified by U.S. Pat. Nos. 5,168,372 to Sweetser and 5,051,837 to McJunkin, provides options of selectable time periods. Optionally different viewers may be identified and assigned different time allotments.

Another subcategory of prior art patents, exemplified by U.S. Pat. Nos. 4,718,107 to Hayes, and 5,053,884 to Kamijyo, teaches controlling the channels viewed without regard to time of day or total viewing time.

U.S. Pat. No. 4,510,623 to Bonneau et al for a TELEVISION CHANNEL LOCKOUT teaches user inputting a non-volatile memory for inhibiting selected channels for a predetermined period of time, but utilizes only a conventional alpha-numeric display device.

There is an unfilled need for a viewing controller system that allows the parent comprehensive and user-friendly pre-programming control over both channels and time periods of viewing for a predetermined future time period, e.g. the coming week, with display capability that provides a graphic display that shows the channel/time relationship.

BRIEF SUMMARY OF THE INVENTION

A TV/video viewing supervision system including apparatus that enables a supervisor (typically a parent controlling children's viewing) to selectably preprogram the hours, programs and/or channels of television, VCR, cable TV, satellite TV and/or game video viewing that are allowed and/or blocked from viewing. The system features a channel/time matrix that can be displayed on the video/television viewing screen and that can be programmed with a keypad-controlled cursor of a hand-held remote unit to set up a viewing schedule for future time period, for example a coming week, e.g. in half hour blocks. The present invention provides a user-friendly system for controlling both viewing time and channel selection for a future time period. In addition, the present invention provides a user with an easily generated time/channel selection matrix covering a wide range of future time periods and channels. The present invention also provides the user with the option of either blocking selected channels/time periods or allowing selected channels/time periods and provides an easily viewed graphic display that shows the channel/time relationship and gives detailed status information regarding viewing allowance/inhibit.

BRIEF DESCRIPTION OF THE DRAWINGS

The above features of the present invention will be more fully understood from the following description taken with the accompanying drawings in which:

FIG. 2a is an exemplary embodiment of the remote control unit 12 referenced in FIG. 1a.

FIG. 2b is an alternate embodiment of the remote control unit referenced in FIG. 2a.

FIG. 2c is an exemplary block diagram of the remote control unit 12 referenced in FIG. 2a.

FIG. 3 illustrates the control unit 10 referenced in

FIG. 1a.

FIG. 6b illustrates a portion of an exemplary set-up display.

DETAILED DESCRIPTION OF THE INVENTION

An apparatus and a method for an implementation of a video viewing supervision system are described. In the following description, numerous specific details are set forth such as various commands, modes, etc., in order to provide a thorough understanding of the present invention. It will be obvious, however, to one skilled in the art that the present invention may be practiced without these specific details. In other instances, well known circuits, structures and techniques have not been shown in detail in order not to unnecessarily obscure the present invention.

Figure 1A:
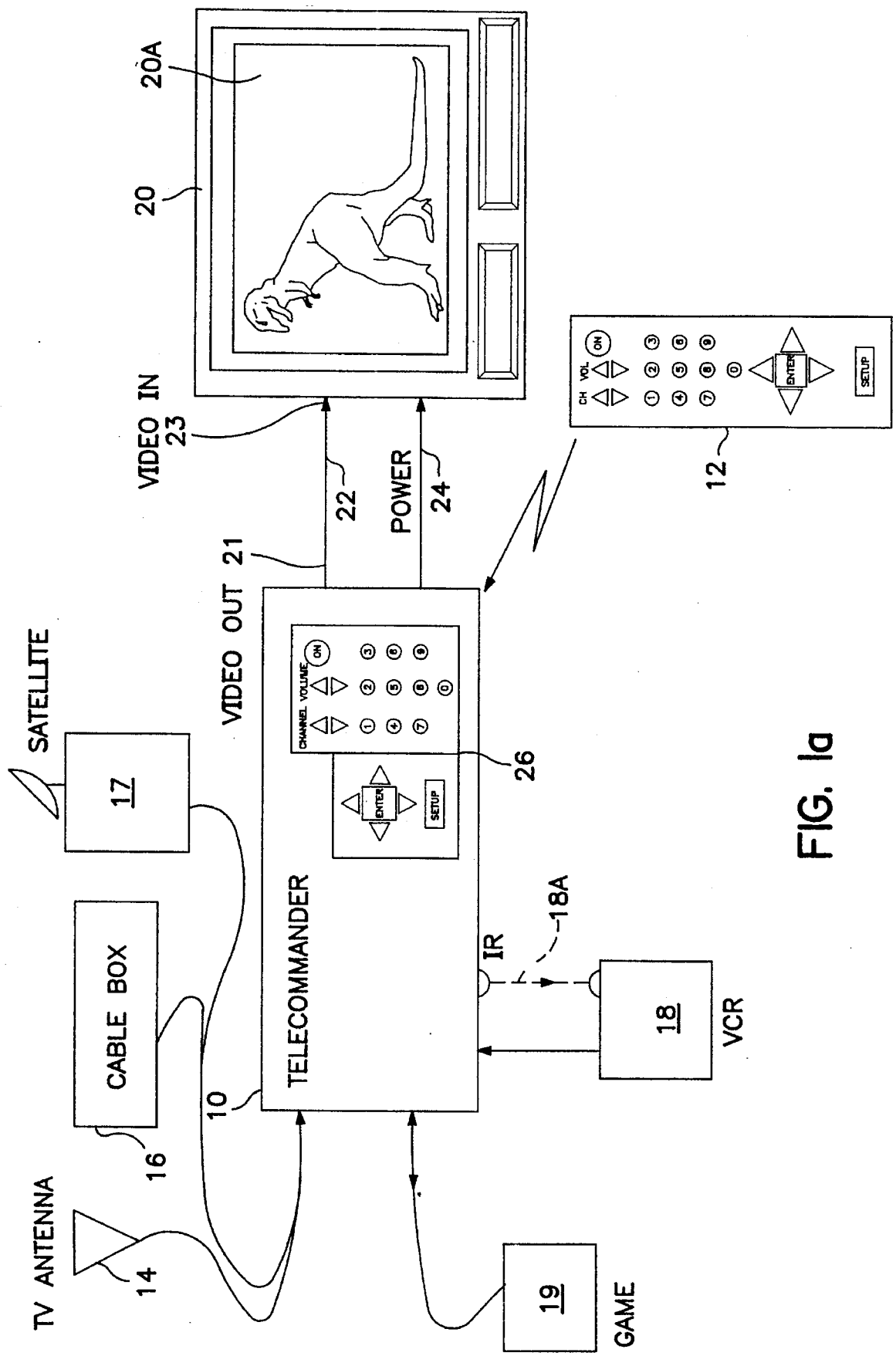
FIG. 1a is a system block diagram of an exemplary embodiment of the present invention.

FIG. 1a illustrates an embodiment of the present invention, a main control unit (TeleCommander) 10 and remote keypad unit 12 of the present device connected into a typical TV home entertainment system. Unit 10 contains a cable-compatible electrically controlled TV tuner, receiving input from a conventional antenna (or cable input) 14, a conventional cable decoder/translate box 16, a satellite receiver box 17 and/or VCR 18. Antenna 14, cable box 16 and satellite 17 are illustrated as being coupled to unit 10, however, typically only one is used or a selection capability between antenna 14, cable box 16 and satellite 17 may be provided. Such selection capability is not part of the present invention.

VCR 18 may be operationally controlled via an IR link 18A from control unit 10, and/or by other peripheral unit(s) 19 such as video games or multi-media equipment. Remote control 12 allows the parent to program unit 10 and the child to change channels and volume at a distance from unit 10 and TV 20.

The arrow and Enter keys are only active in the Program mode and not active in the Supervised Viewing or Full Access modes. These various modes will be described in more detail in the description accompanying FIG. 6a. The keys on unit 10 are identical to the keys on remote control 12, and have the same effects. A conventional television receiver 20 (which may include certain other functions such as a VCR) receives a composite signal with audio and video from unit 10 via coaxial cable 22 and AC power via power linecord 24. Thus unit 10 can control viewing of TV 20 with monitor 20A by interrupting its composite input signal and/or the A.C. power.

The Video Out connector 21 permits connection of the selected video to an external monitor and may be an RCA jack carrying an NTSC composite signal. Unit 10 may include an internal video tuner for the selection of video signals, in which case, a modulated Video Out may provide the selected channel frequency shifted to a predetermined channel frequency such as channel 3 or 4 selected by the switch on the rear panel of unit 10. The signal may be provided on a 75 Ω "F" type connector.

A second keypad 26 is shown on unit 10. The system can operate from either the remote keypad 12 or the fixed keypad 26 and the system can be designed to provide either or both. Furthermore unit 10 can preprogram and control VCR recording from a selected channel at a selected time period, as commanded via keypads 12 and 26. The user can introduce any externally generated composite NTSC video signal into the composite video input 23. Inputs may originate from a videogame, VCR, camcorder, TV receiver or other devices capable of producing a compatible composite signal. The input signal specifications are 1 volt p—p, high input impedance, unterminated.

Subject invention may include the provision of a tamper-proof locked enclosure attached to unit 10 enclosing its input and output connections, to prevent unauthorized persons from bypassing the signal/power around unit 10. Unit 10 may be implemented with a suitably programmed microprocessor. Optional refinements include channel grouping capabilities, capability of controlling cable TV box 16 and/or VCR (typically via its IR link) from the main control unit 10.

The main control unit can be implemented as a separate unit as indicated in FIG. 1 in its own enclosure box. Alternatively control unit 10 could be incorporated into another system element such as TV 20 or cable box 16, reducing the overall system cost by reducing the number of TV tuners and enclosure boxes in the system.

Figure 1B:
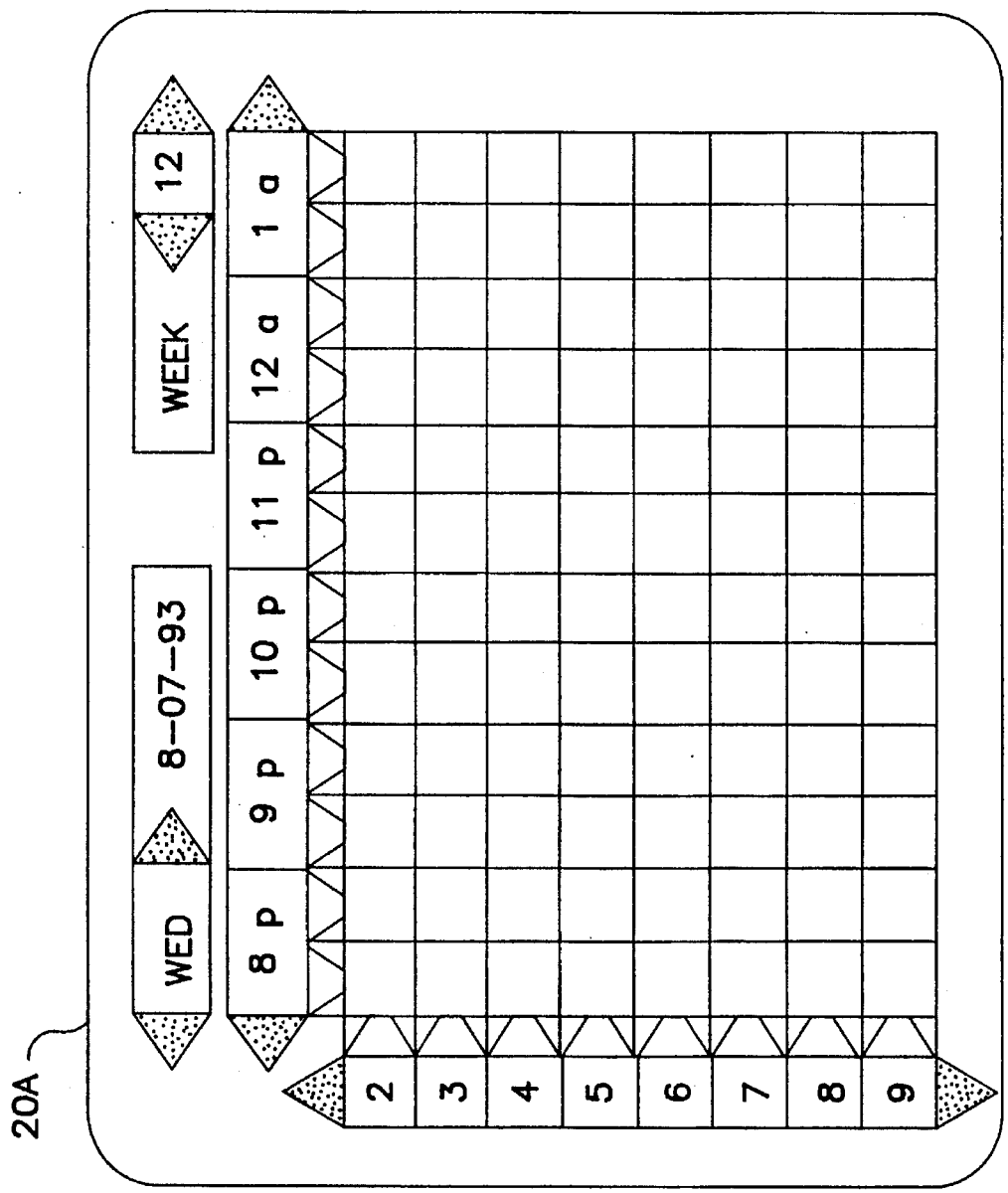
FIG. 1b illustrates an exemplary embodiment of a selection matrix of the present invention.

FIG. 1b illustrates an exemplary selection matrix which may be displayed on monitor 20A on TV 20. A more detailed description of the selection matrix will be provided in the descriptions accompanying FIGS. 7 through 11.

Figure 2A:
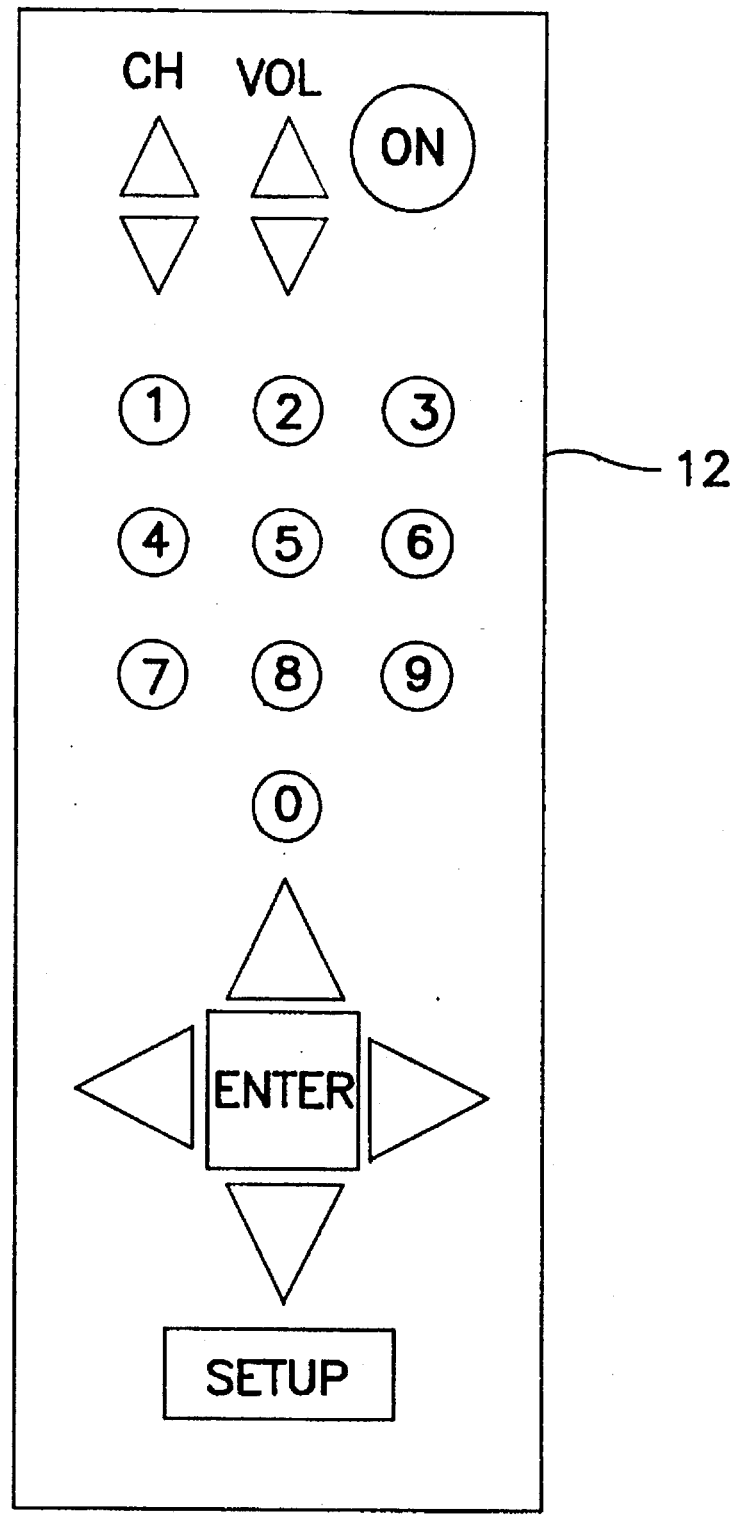

FIG. 2a illustrates the exemplary remote control 12 referenced in FIG. 1a. Remote control 12 has a keypad which includes control keys, allowing a user to issue commands to unit 10. In this embodiment, the keypad on the remote control is the same as the keypad on the unit 10, and accordingly the function of each individual key will be later described with respect to the unit 10. In summary however, it is to be noted that the remote control 12 of this embodiment includes 10 keys numbered 0 through 9, 2 channel up-down keys, 2 volume up-down keys, an on-off key, a setup key, four cursor control keys and an enter key, for a total of 21 keys and thus 21 associated key operated switches.

Figure 2B:
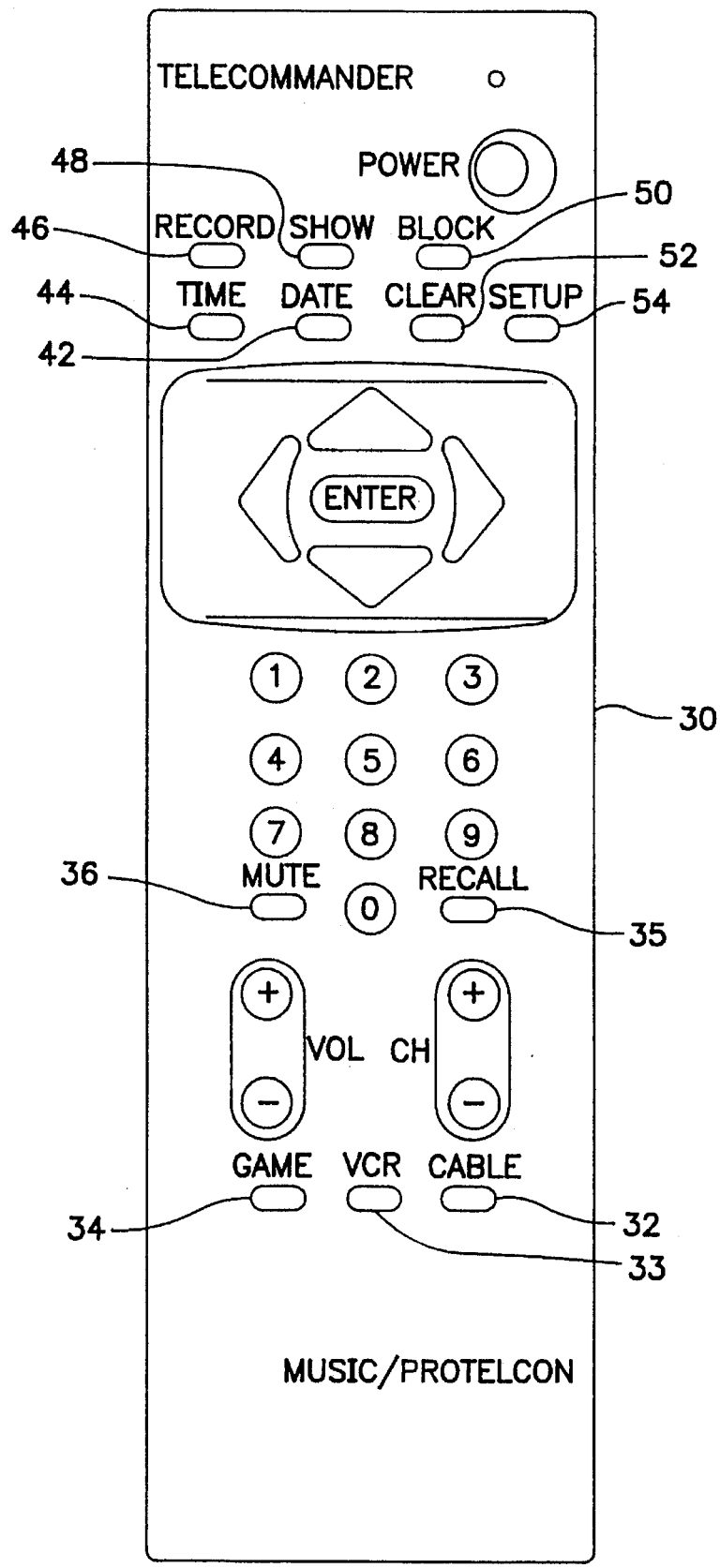

FIG. 2b illustrates an alternate embodiment of the exemplary remote control referenced in FIG. 2a. Additional keys are provided on remote control 30, including cable key 32, VCR key 33, game key 34, recall key 35, mute key 36, date key 42, time key 44, record key 46, show key 48, block key 50, clear key 52 and setup key 54. Cable key 32, VCR key 33 and game key 34 may be used to select the source of composite video/audio input. Time key 44 and date key 42, show key 48, block key 50, clear key 52 and setup key 54 may be used during the system's program mode to select the times and channels for which viewing is to be controlled.

Figure 2C:
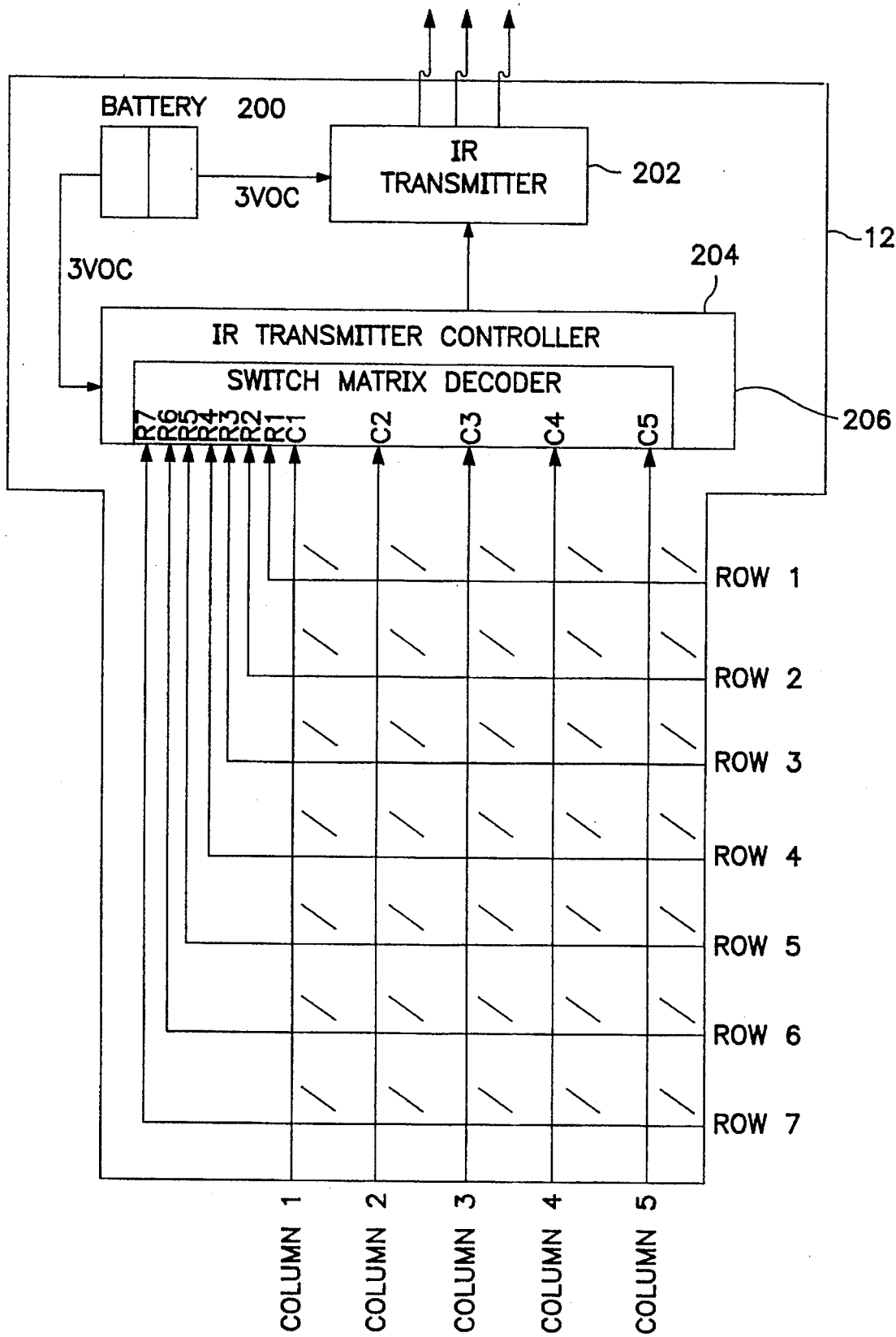

FIG. 2c illustrates an exemplary block diagram of an embodiment of remote control 12 referenced in FIG. 2a. Battery 200 is coupled to IR (infrared) transmitter 202 and IR transmitter controller 204. Switch matrix decoder 206 is coupled to what could be up to 35 switches in a 5 by 7 logical matrix of switches corresponding to the keys on the remote control 12. While the matrix is shown as a rectangular matrix corresponding to the logical organization of the switches, the same are physically disposed in accordance with the layout shown in FIG. 2a. Also while the matrix and matrix decoder shown may accommodate up to 35 switches, only the 21 herein before identified are used in this embodiment. The switch decoder 206 decodes commands from the user as input on to the keypad of remote control 12, with IR transmitter controller 204 enabling IR transmitter 202 to transmit commands decoded by switch matrix decoder 206 to unit 10. IR remote control units for TV receiver, VCR and similar device control, and the circuits therefore are well known and therefore are not further described herein.

Figure 3:
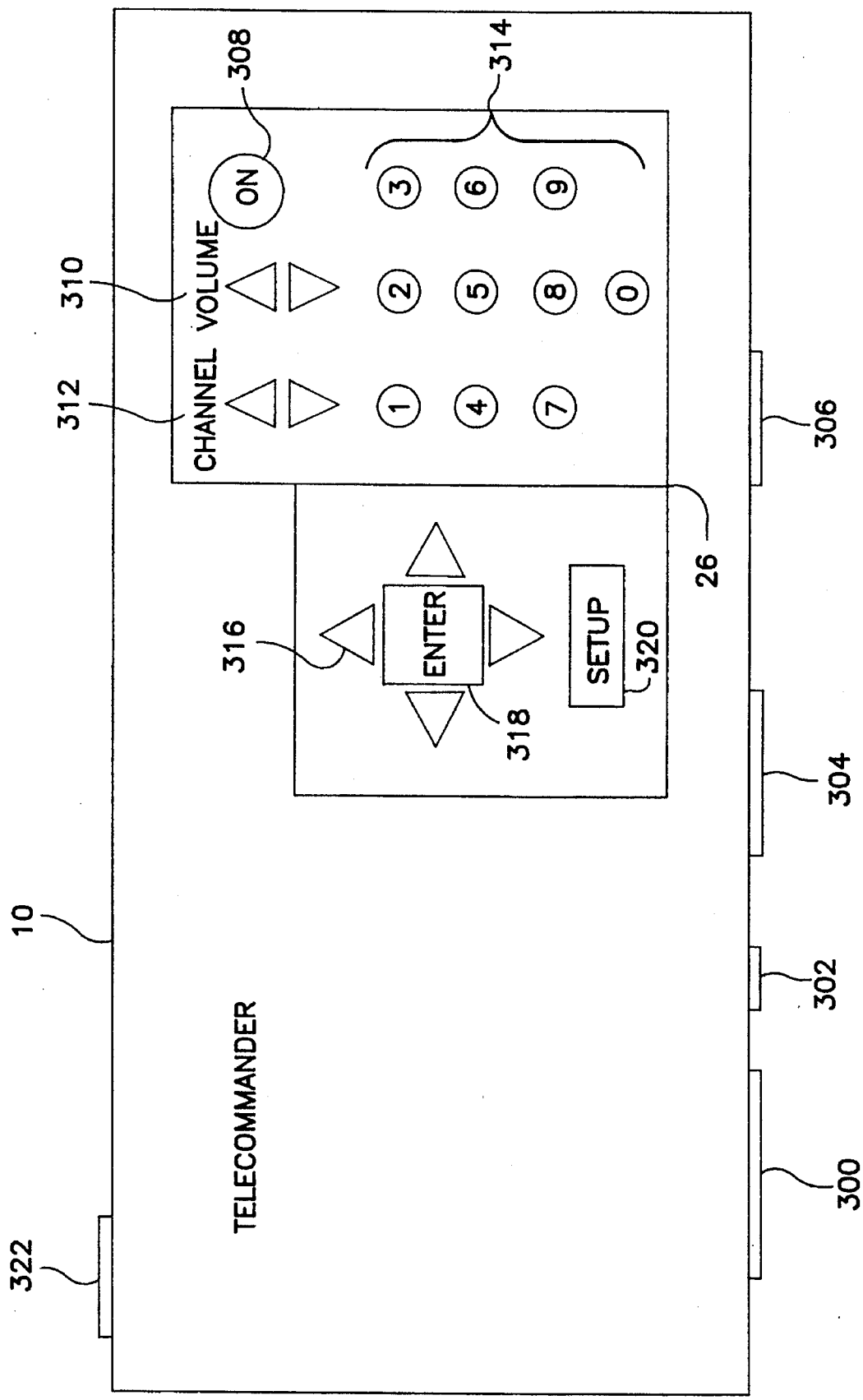

FIG. 3 illustrates unit 10 referenced in FIG. 1a. The exemplary implementation of unit 10 illustrated in Figure 3 may comprise of a mode keyswitch 300 which allows a parent to choose among three operating modes including supervised viewing, full access, and program modes. The keyswitch on unit 10 allows the parent to activate the program mode, but not inadvertently leave the unit 10 in the program mode as the key cannot be removed when the unit 10 is in the program mode. Thus a parent can only remove the key from the keyswitch in the supervised viewing mode. In the alternative, a personal identification number (PIN) may be set up at the set-up stage (described in more detail for the description accompanying FIG. 6a) wherein a parent may enter the PIN number on either unit 10 or remote control unit 12, allowing the parent to choose among the three operating modes.

Power-on switch 308 may be a push-on, push-off key switch, and when activated, LED indicator 302 will come on. In the alternative, channel display 304, a three-digit LED numerical display, may activate to indicate that the power is on. Channel display 304 displays the number of the channel currently selected by the tuner in unit 10. In either case, these indicators are preferably viewable from the front face of the unit 10, as the unit 10 most commonly will be on or near the TV receiver 20 (FIG. 1) and once on, frequently operated using the remote control 12. In that regard, remote control receiver window 306, also preferably on the front face of the unit 10, allows the infrared light emitted by remote control unit 12 to enter unit 10 enclosure for detection by an internal detector.

Power on-off switch 308 controls power both to unit 10 and to conventional television receiver 20 connected to the switched power outlet of unit 10. A pair of volume keys 310 allow for the increase and decrease of volume level in. Also a pair of keys for channel selection allow for changes in channel. These functions operate using well known circuits for these functions. Keys 314 for digits 0 through 9 permits entry of channel numbers, date, time and of any other numerical inputs. Up, down, left and right cursor arrow keys 316 control the position of the cursor on the display screen of, for example, a conventional television receiver when the system is in the program mode. Enter key 318 allows a parent to select an entry at the position indicated by the cursor in program mode. Set-up key 320 permits the parent to set unit 10 configuration in program mode. Also typically the rear panel may have a two-position slide switch 322 coupled to a modulator in the unit 10 which selects the channel onto which the modulator imposes the selected video signal.

Figure 4:
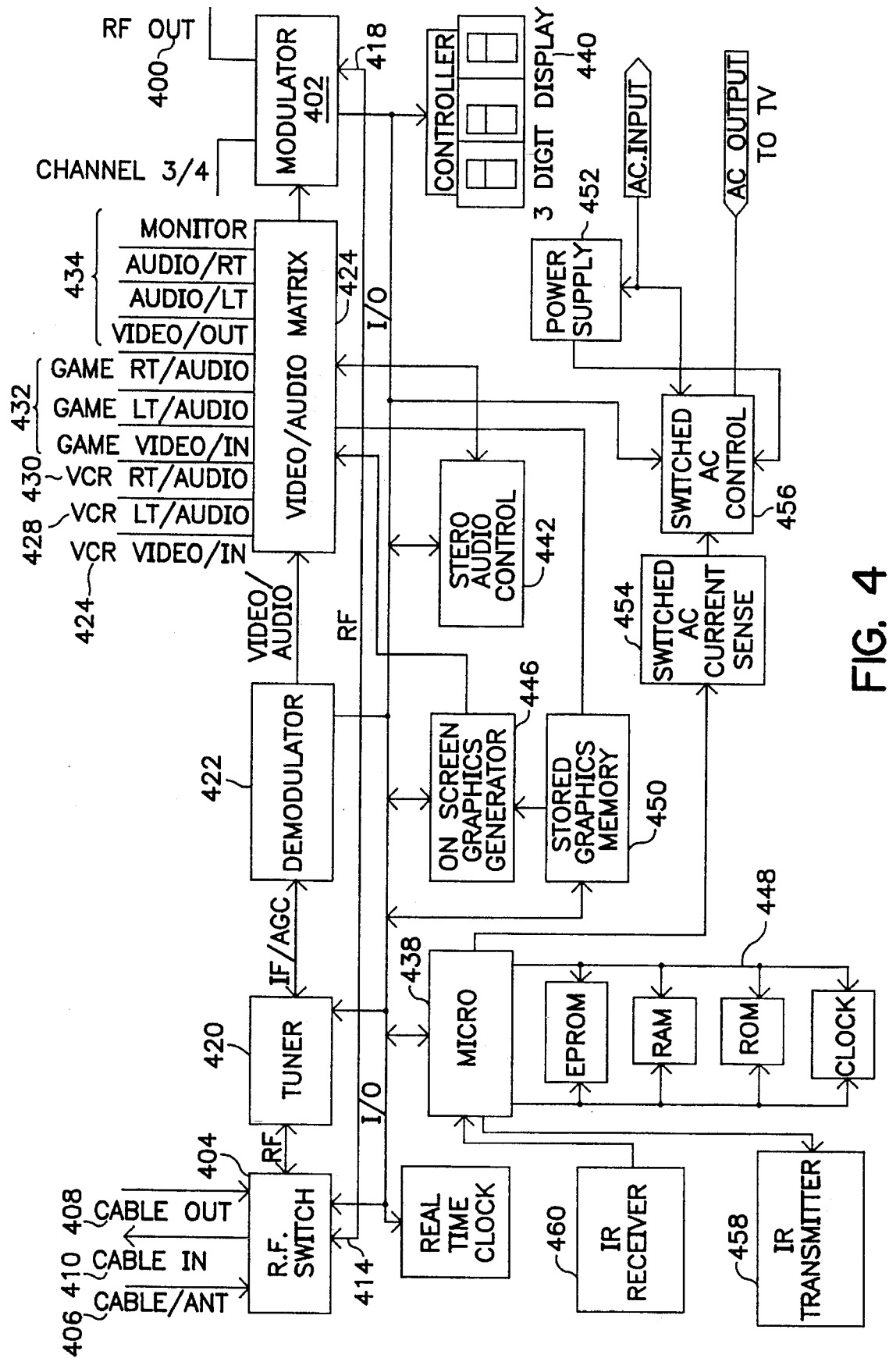
FIG. 4 is a block diagram of the control unit 10 illustrated in FIG. 3.

FIG. 4 is a circuit block diagram of unit 10 illustrated in FIGS. 1 and 3. IR receiver 460 receives inputs from remote control 12. RF switch 404 receives the inputs from the cable or antenna 406 or inputs straight from the cable box 408. RF Out 400 from modulator 402 provides the selected channel as an RF output on either channel 3 or 4. The unit 10 may be used to shut off the signal from the cable box. The signal output 410 to a cable box is controlled by RF switch 404 to disable the cable box to prevent a child from watching cable. If a user decides to allow the child to watch a cable channel, then RF switch 404 is enabled. The signal from the cable box is then transmitted straight from RF switch 404 to modulator 402. particular, line 414 from RF OUT 416 on the RF switch is coupled to RF IN 418 of modulator 402 for signal transmission.

Assuming cable viewing is to be limited, tuner 420 receives the cable input from RF switch 404, selects one of the available channels (which may number 180) and frequency shifts the same to an IF (intermediate frequency) signal for amplification and AGC (automatic gain control) purposes. The IF signal is then demodulated by demodulator 422 to strip out the audio and video broadbands. The audio and video broadbands are then coupled to audio/video matrix 424. In audio/video matrix 424, inputs 426 from a video VCR are taken in. Audio inputs from a VCR may be received through left channel and right channel audio inputs 428 and 430. Inputs 432 from games such as SEGA® or NINTENDO® or any other video game system may also be received. These auxiliary systems may be plugged into video/audio matrix 424 to be centrally controlled by unit 10. Thus all audio/video inputs that a child would be able to watch may be under supervision using the system of the present invention.

Monitor video out and monitor left and right audio outputs 434 enables transmission to a monitor with broadband and left channel/right channel audio capability (TV/monitor). With implementation of the present invention with monitors without the broadband and left channel/right channel audio capability, the audio/video signal is transmitted from RF OUT 400 of modulator 402 on channel 3 or 4 in accordance with the setting of slide switch 322 (FIG. 3).

Real-time clock 436, a commercially available integrated circuit, keeps track of time, i.e. days, months. Microprocessor controller 438 controls the system, including the tuner 420 in accordance with previous inputs stored in RAM 448. Three seven-segment displays 440 and stereo audio control 442 controlled by the microprocessor are used for tuning (channel selection) indication and volume control.

Graphic generator 446 is an integrated circuit chip controlled by microprocessor 438 to retrieve and generate various graphic screens (see FIG. 4a) to be displayed on the monitor. Microcontroller 438 calls up the appropriate graphics on the display screen under software control. When a user goes into program mode, the cable input is shut off and unit 10 displays its own graphics. The graphics may be stored in memory such as in EPROM, RAM and ROM 448. Most of the graphics may be stored in the graphics chip or may preferably be stored external to the graphic chip such as in stored graphic memory 450. Such graphics systems are well known.

The above-mentioned storage device(s) contains the various graphic screens and all of the combination of screens prompted by the user commands such as for the cursor, the date, the countdown for the video (i.e. how many hours a child is allowed to watch TV). Assuming stored graphic memory 450 has all the graphics to be displayed on the screen, graphic generator 446 calls up the graphic screen requested by microcontroller 438. The graphic screen information is then transmitted to video/audio matrix 424 as a video signal and output to the monitor or through modulator 402 channel 3/4.

Power supply 452 may take 110 volts in, and output various AC voltages. When the TV is plugged into the system, the AC power to the television set may be controlled by switched AC control 456. Current sense 454 senses the output current to determine if the TV is on or off. Both the VCR and TV may be turned on or off by IR transmitter 458. Current sense 454 monitors the current increases and compares the increases to a predetermined level. Microprocessor 438 reads that level and determines if the VCR or TV is turned on, and may send out a command to IR transmitter 458 to turn on or off the VCR or TV. Memory comprising EPROM, RAM and ROM 448 may be used to store the programming for microcontroller 438. In the alternative, the programming may be embedded into microcontroller 438 depending upon the choice of architecture of the circuitry.

In the circuit block diagram of FIG. 4, the various blocks individually represent common and well known circuits and circuit functions, and are generally readily commercially available, in many cases as single integrated circuits.

Figure 5:
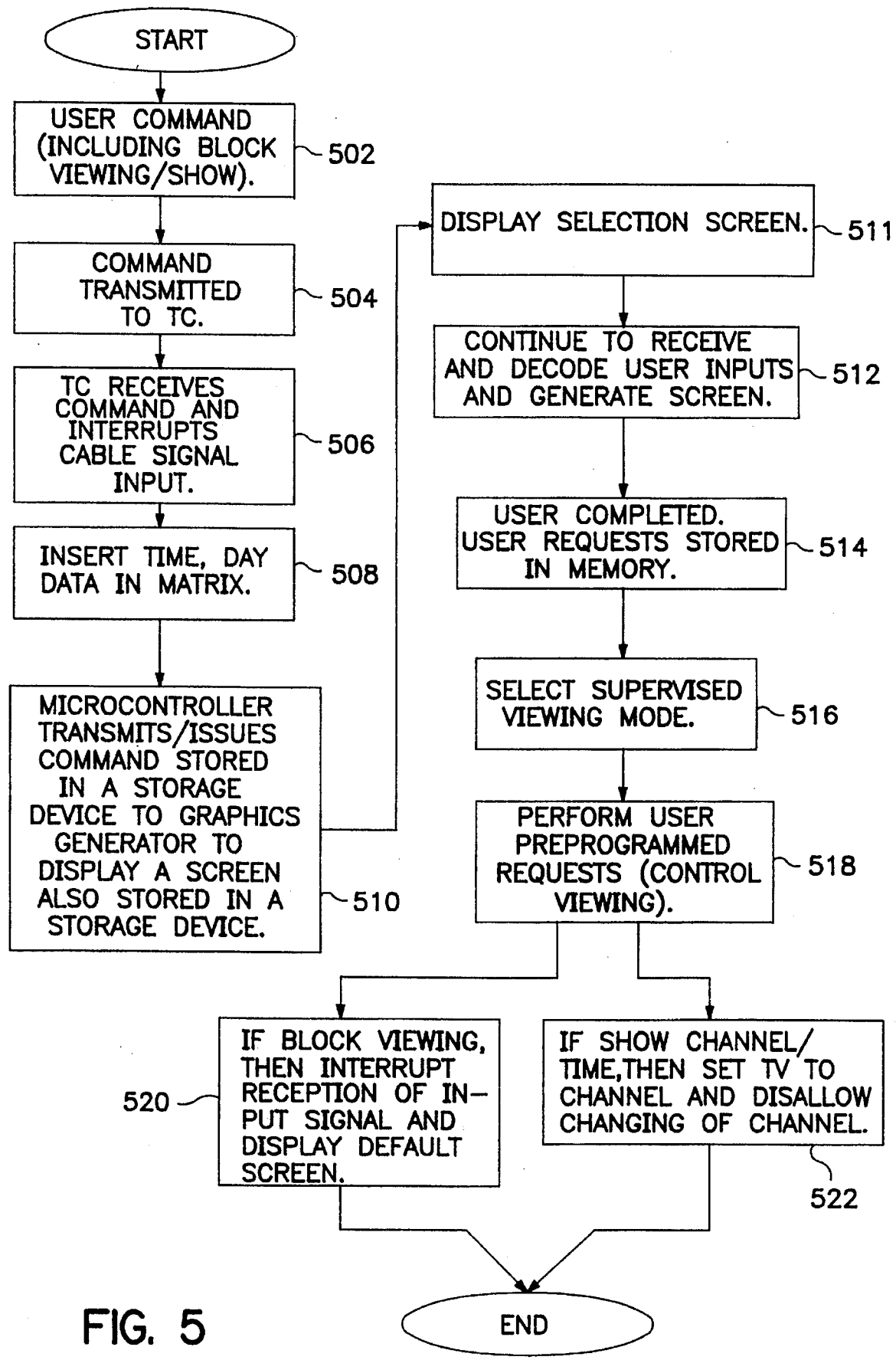
FIG. 5 is a flow diagram of general steps followed by the system of the present invention.

FIG. 5 is a flow diagram illustrating the general steps followed by the system of the present invention. In step 502, a user sends a command via hand-held remote control 12 (or unit 10). In step 504, remote control 12 transmits a signal to unit 10 to go into the system's program mode. In step 506, unit 10 disrupts the signal coming in from the cable. In step 508, unit 10 determines the time, and day, and inserts the data into a matrix to be displayed onto the screen. The time bar may display a time range close to the actual time selected. In step 510, the microcontroller transmits a command to the graphics generator to display the selection matrix.

In step 512, as the user inputs commands such as the cursor to a square or time/channel bars, the microcontroller reads the command, decodes the command and performs the task and sends the command to the graphic generator to generate the screen. If the user sends another command, then the process loops back to step 512. Otherwise, in step 514, the user has completed all desired commands and the user requests are stored in memory in unit 10. In step 516, when the supervised viewing mode is selected by the user, the microprocessor reads the time and determines if the memory has any user preprogramming commands stored.

In step 518, the microcontroller will retrieve the preprogrammed user requests and perform requested tasks if applicable. In step 520, if user request is to block viewing, then the reception of the composite input signal is interrupted and a default screen (e.g. "THIS CHANNEL IS BLOCKED") is displayed on the TV screen. In step 522, if the user request is to show a particular channel at a particular time, then the TV is set to the selected channel at the selected time and the changing of the channel is disallowed. There are various ways to programing the microcontroller. With the given detail, a person skilled in the art may readily understand the method by which to program the microcontroller.

Figure 6A:
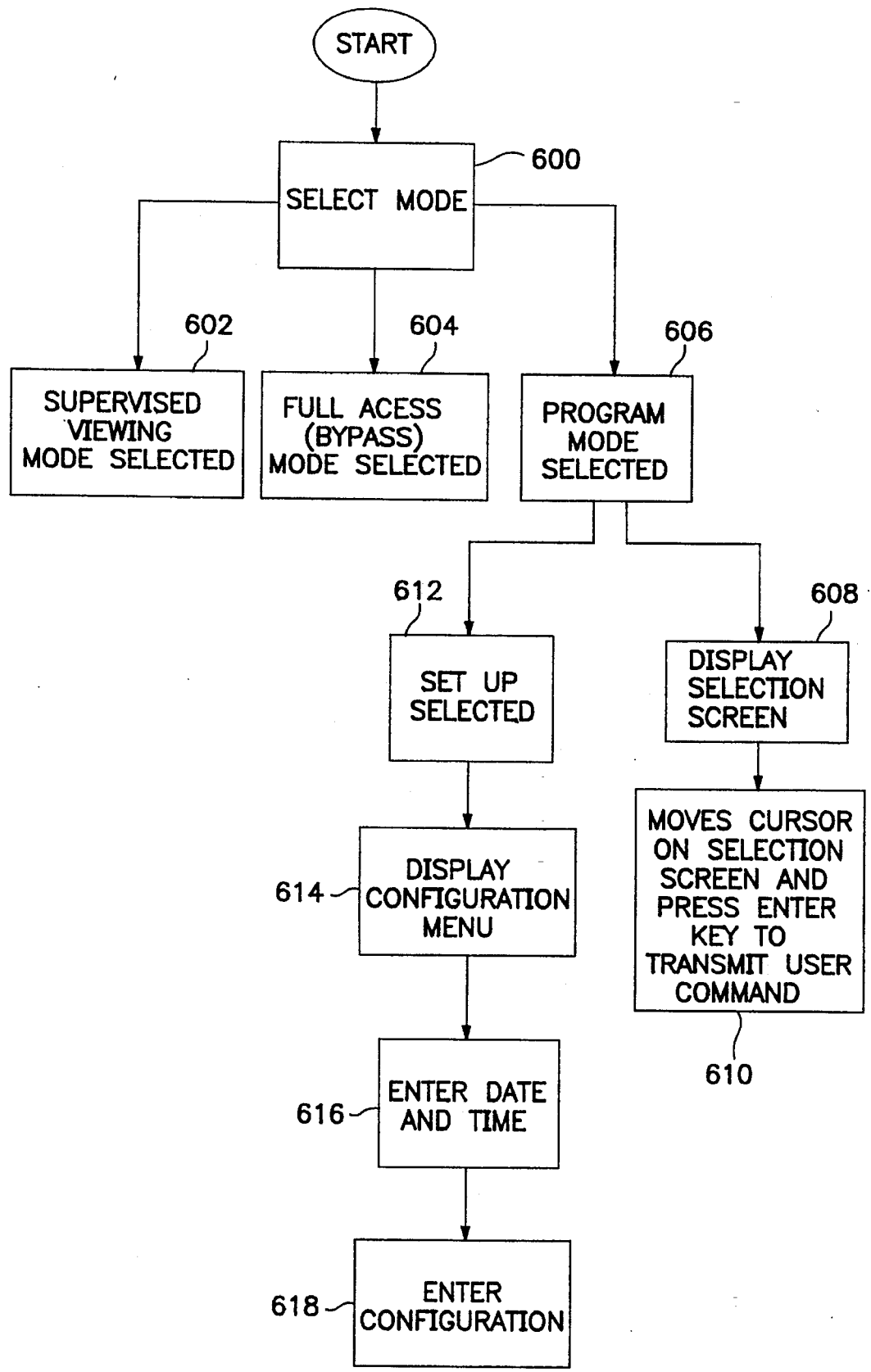
FIG. 6a is a flow diagram of selection of different modes available through an exemplary embodiment of the present invention.

FIG. 6a is a flow diagram illustrating implementation of different modes available using the system of the present invention. In block 600, a select key is pressed on either unit 10 or remote control unit 12. In block 602, the supervised viewing mode is selected by the user. During a supervised viewing mode, unit 10 only permits the child to watch TV during the times, on the channels, and to the time limit previously selected by the parent. The parent can completely block a specific channel, completely block use of the TV during selected times, block a selected program by blocking a channel during a selected time, block any combination of channels, time, and programs, and set a time allowance limit on the number of viewing hours per day, week, or month. During a blocked time or when the time allowance has expired, unit 10 interrupts the video signal input to the TV and displays a default screen with, for example, a message such as "THIS CHANNEL IS BLOCKED." During an unblocked time in a supervised viewing mode, unit 10 will power the TV when the On key is pressed. Unit 10 will permit the child to view any channel which is not blocked. If the child selects a blocked channel, the monitor will show a "Not Available" screen.

In step 604, the full access mode is selected. Here unit 10 does not restrict selection of channel or time and unit 10 functions as a remote control unit tuner. In step 606, program mode is selected. During program mode, unit 10 permits the parent to selectively block TV viewing times, channels and programs and to set the time a child is allowed to watch the TV. A user uses the keyswitch or PIN to select the program mode. In step 608, unit 10 displays a selection screen. In step 610, a user may move the cursor displayed on the screen around the programing screen using the four arrow keys on either unit 10 or remote control unit 12 and press the enter key to make a selection.

As the cursor moves around on the screen, the screen area containing the cursor changes in brightness (flickers), so that the parent can easily see the cursor on either a color or black and white TV. When the parent presses the Enter key, the cursor changes again in color and brightness, to provide a positive feedback indication. The cursor always sits fully in a position where the parent can make a choice. The parent can only move the cursor to portions of the screen where a choice can be made. The cursor stops at the top, bottom, left, and right extremes of the screen, and does not roll around. In an alternate embodiment, the cursor may wrap around. For example, the cursor at the right most portion of the screen may be displayed at the left most portion of the screen upon an attempt by the user to move the cursor further to the right. In another embodiment, the cursor may scroll the row or column it is positioned at, upon an attempt by the user to move the cursor further past the borders of the matrix.

In step 612, a user may press the set-up button on either unit 10 or remote control unit 12 while in the program mode. In step 614, unit 10 displays a configuration set-up menu in the middle of the programing screen displayed on the television monitor (See FIG. 6b). In step 616, unit 10 may initially place the cursor on the first digit of the time entry. To set the time and date, the parent enters time and date digits using number keys.

Unit 10 automatically increments the cursor position after the parent presses each digit. The parent may press the Enter key to toggle the time between AM and PM. When the time is correctly set, the parent presses the down or right arrow key to move to the first date digit. In step 618, after the last year digit is entered, the cursor moves to the Input entry. Each press of the Enter key advances through the sequence of input signal possibilities. Possibilities are: Antenna, STD Cable, HRC Cable, IRC Cable. The parent can use the left, right, up and down arrows to move the cursor to adjacent digit and entry locations. The cursor cannot move to any location other than a digit or entry location. In step 618, the parent presses the Setup key again to keep the entries and leave the Configuration Setup menu.

Figure 7:
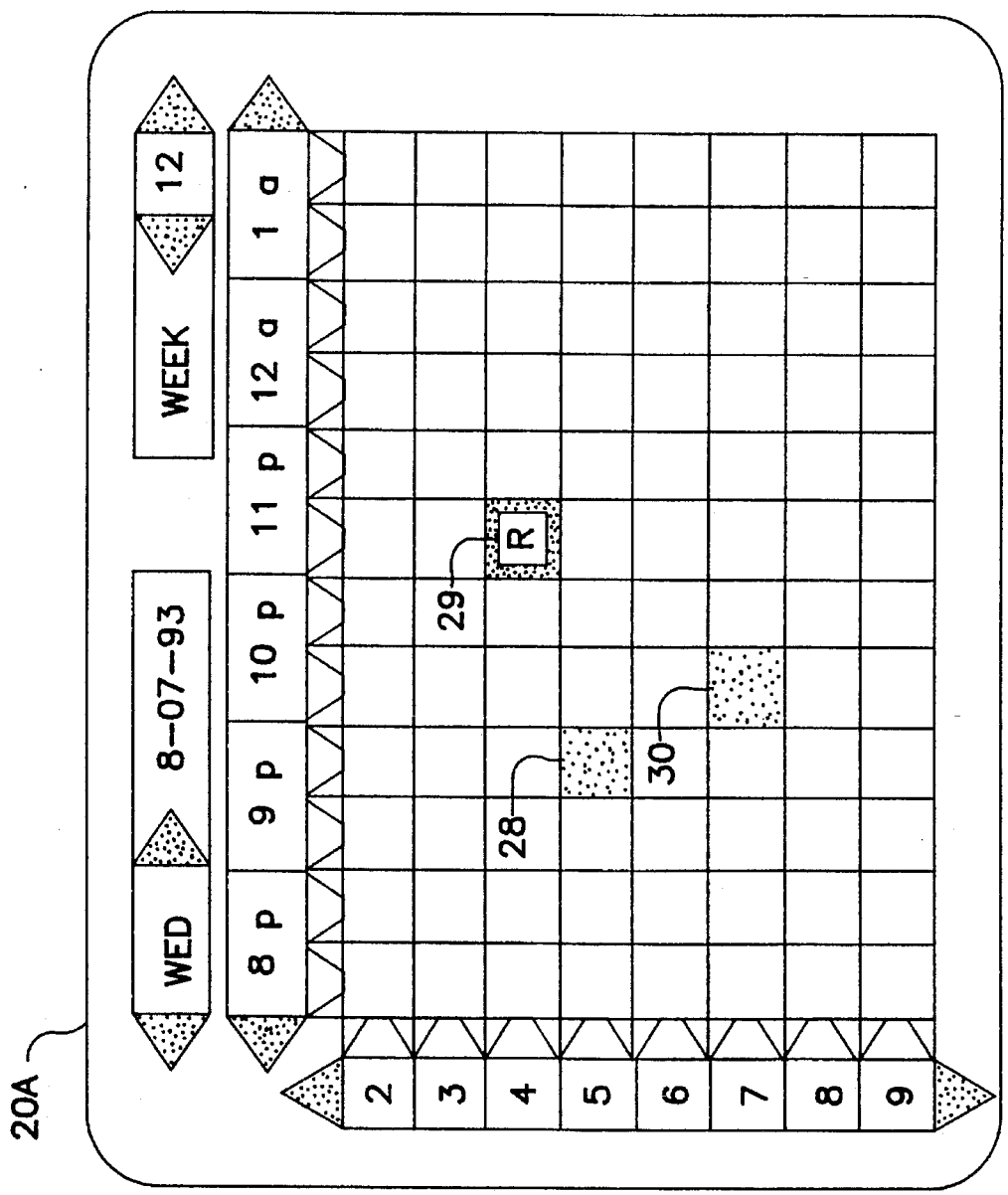
FIG. 7 is an exemplary set-up data displayed on a cell matrix of a special set-up display on the TV/video viewing system.

FIG. 7 illustrates a programming matrix pattern as it will appear on the screen 20A of TV 20. Time is displayed in half hour steps in the X axis along the top, while channel numbers are displayed in a vertical row in the Y axis at the left. Entries on keypad 12 or 26 (FIG. 1a) energize selected cells on the screen display. Different commands can be directed to a cell (square), identified by different symbols including by colors and/or shading detail. For example solid red may indicate the user's request to block the corresponding channel for the corresponding time segment permanently each week, solid green may indicate the user's request to allow viewing permanently each week, red brick pattern may indicate the user's request to block a single event, green brick may indicate the user's request to allow viewing of a single event, etc. Furthermore there may be other symbols including an alpha character shown in the cell, for example "R" to indicate VCR recording. In the example shown, cell 28 with symbol red 21 blocks channel 5 for the period 9:30–10:00 PM, cell 29 with n symbol "R" 23 is set to record channel 4 on a VCR from 11:00 to 11:30 PM, and cell 30 with symbol green 25 allows channel 7 for the time period 10:00–10:30 PM.

Figure 8:
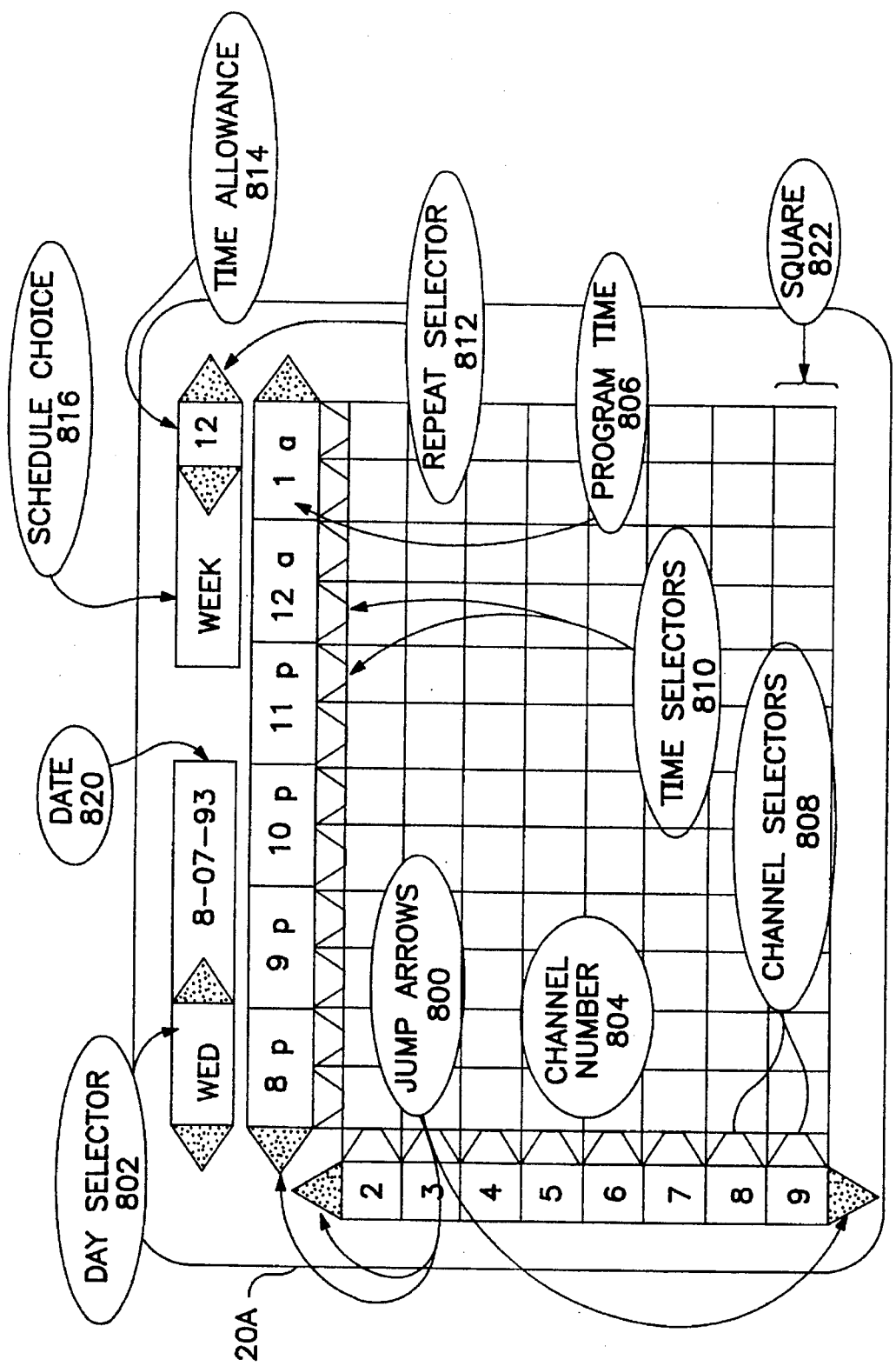
FIG. 8 illustrates exemplary key to symbols that may be illustrated on an exemplary set-up display.

FIG. 8 illustrates examples of data displayed along with the matrix. Jump arrows 800 allows the viewed window to be shifted to display a different range horizontally or vertically. Day selector 802 is a box which shows the day being programmed. The day shown in day selector box 802 may be changed. A user may move the cursor to one of the jump arrows 800 and press the Enter key on either unit 10 or remote control 12. For each press of the Enter key when the cursor is on the left jump arrow 800, the day will decrease by one. For each press of the Enter key when the cursor is on the right jump arrow 800, the day will increase by one.

Channel number 804 illustrates eight program channels and may have several different features. A user may use the jump arrow of the channel number bar to select channels shown on channel number bar 804. Channels selectors 808 located to the right of each channel number on channel number bar 804 may be used to block or unblock a channel for viewing. When viewing of specific channels are blocked utilizing channel selectors 808, unit 10 will block viewing of that specific channel while the system is in supervised viewing mode.

Program time bar 806 in the exemplary matrix display shows the program times for six hours of the day in one-half hour increments. The program time bar 806 may have several different features including jump arrows 800 at each end of program time bar 806 allowing a user to select hours of the day shown on program time bar 806. The program times being displayed by program time bar 806 may change by pressing the jump arrows 800 on the left and right sides of program time bar 806. Time selectors 810 under each half-hour of program time bar 806 may be used to block or unblock a time of day for viewing. This feature is similar to channel selectors 808. Repeat selector 812 contains scheduled choice 816 and time allowance 814. In schedule choice 816, a user may select day, week or month. For selection of Day, a user is able to block programs, channels and time on a one-day schedule. In a Week schedule choice, a user may block programs, channels, and time on a day-by-day basis on a one-week schedule. Finally, with a choice of Month, a user may block programs, channels, and time on a day-by-day basis on a twenty-eight day or four week schedule.

Time allowance 814 displays the remaining time allowance in the preset schedule. Thus, time allowance 814 displays the amount of time a child is allowed to view a television while in the supervised viewing mode. This is to restrict the amount of time for example a child is allowed to watch television. Date box 820 displays the month, day and year corresponding to the selected day.

Each square 822 in the screen represents a single channel for a single half-hour interval. For each square, a user may program unit 10 for one of six functions: Blocked for a single event or on a repeat basis, Clear or VCR record, or Show for a single event or on a repeat basis. A user may place the cursor on one of squares 822 and press the Enter key on unit 10 or remote control 12. Each successive press of the Enter key allows a selection between Blocked, Clear, Show or Record. When Clear is selected for square 822, then when unit 10 is in the supervised viewing mode, unit 10 permits a user to view the corresponding channel at the corresponding time if the user chooses. If all squares 822 are Clear then unit 10 functions solely as a remote control TV tuner.

When square 822 is Blocked and unit 10 is in the supervised viewing mode, unit 10 will not permit a viewer (a child) to view the corresponding channel at the corresponding time. If the child selects the blocked channel during the blocked time, unit 10 may display a "Not Available" screen. Finally, when square 822 is selected for Show and unit 10 is in the supervised viewing mode, unit 10 will power on the TV to the specified channel at the specified time automatically. In addition, unit 10 will not permit a child to change channels.

Figure 9:
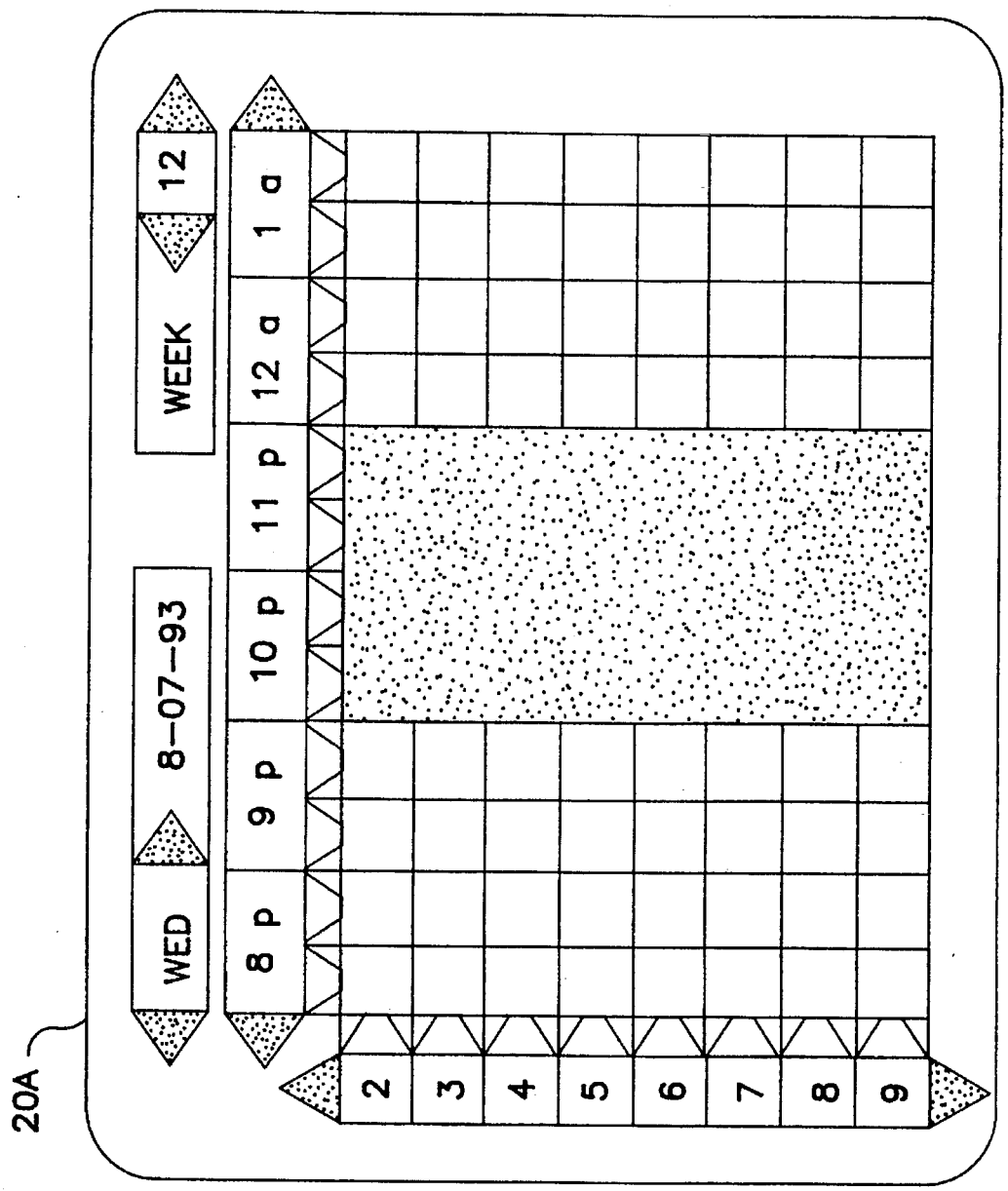
FIG. 9 illustrates an exemplary set-up display indicating all channels blocked for a two hour period.

The matrix size illustrated is only the displayed window portion of a much larger memory matrix which can be designed to accommodate any desired total number of channels and time span: e.g. 181 or more channels, with a month or more time span:

FIG. 9 illustrates an example of a keypad-entered setup that will block all channels over two hour time period (10–11 am) on a particular day and week as indicated.

Figure 10:
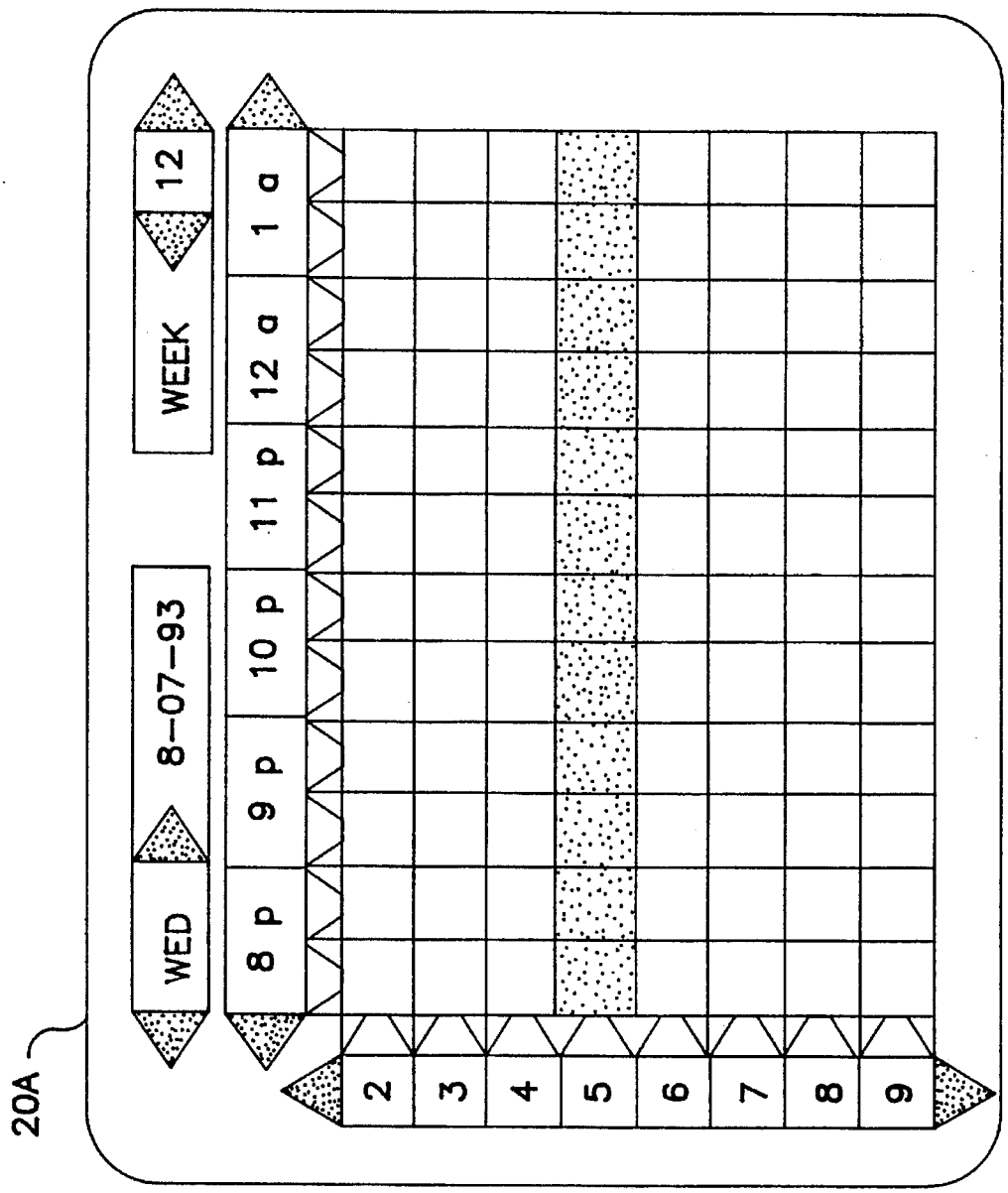
FIG. 10 illustrates an exemplary set-up display indicating one channel (#5) blocked throughout the time period shown.

FIG. 10 illustrates an example of a keypad-entered setup that blocks channel 5 over at least the six hour period on the day and week indicated.

Figure 11:
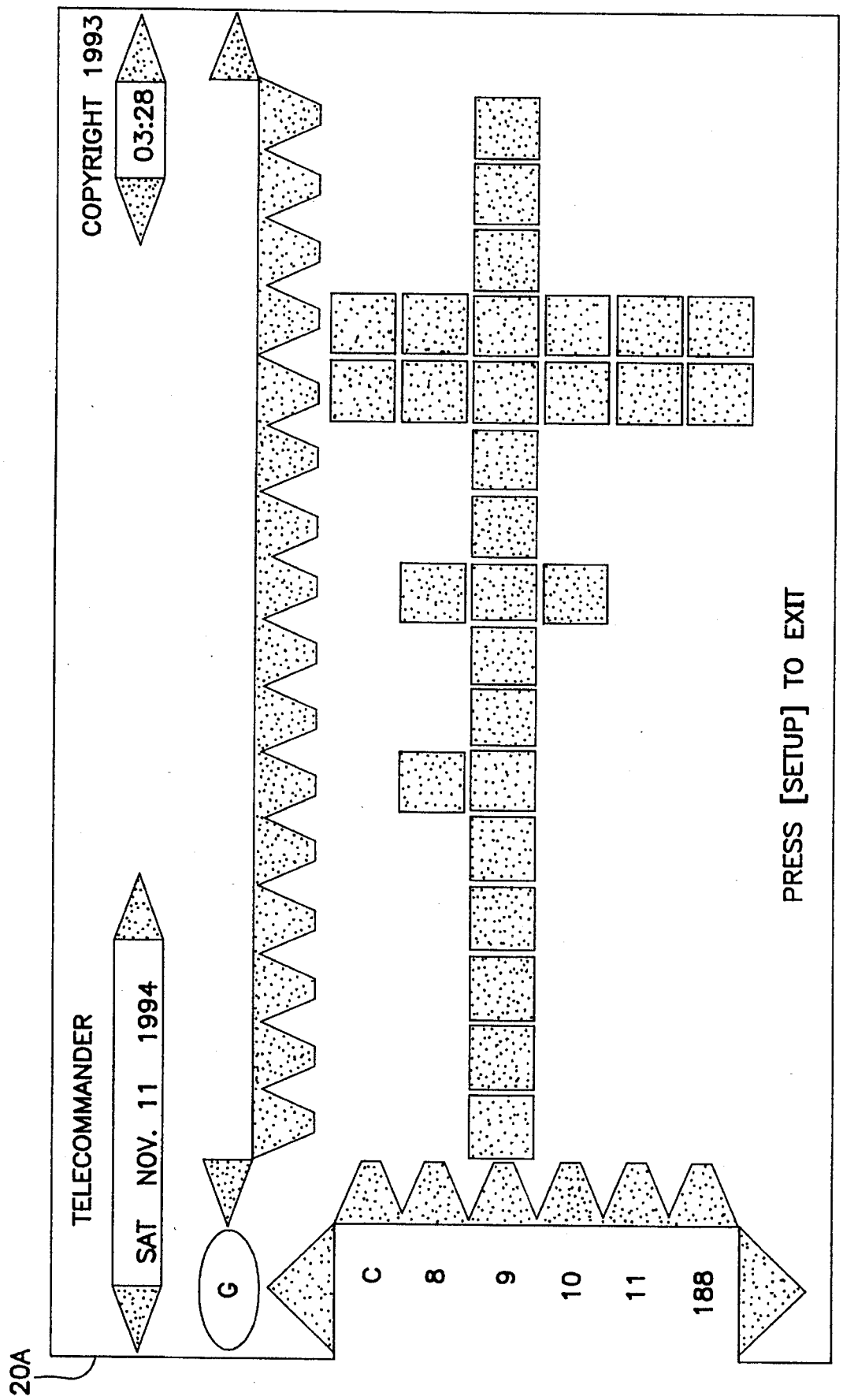
FIG. 11 illustrates an exemplary alternate embodiment of a set-up display.

FIG. 11 illustrates an alternate embodiment of the keypad-entered setup blocking various channels at various times.

What has been described is a method and an apparatus for video viewing supervision. It is anticipated that future TV receivers, VCR's, cable boxes, satellite boxes, video games, mixed media systems and/or the like may be equipped with parental control adaptive facilities such as connector-locks, interfacing adopters, timers, external tuner control capability, etc., that will further co-operate with subject invention in combination therewith.

While certain exemplary embodiments have been described in detail and shown in the accompanying drawings, it is to be understood that such embodiments are merely illustrative of and not restrictive on the broad invention and that this invention not be limited to the specific arrangements and constructions shown and described, since various other modifications may occur to those ordinarily skilled in the art.

What is claimed is:

1. A TV/video viewing supervision system, connected in combination with a TV/video system including a viewing screen and video signal source means, for enabling an authorized user, to control viewing time of selected channels, by another, comprising:

a hand held remote control unit; and a controller unit, controlled by said hand-held remote control unit, having;

a cable-compatible electrically controllable television tuner receiving input from the signal source means;

a microprocessor controlled from said hand held remote control unit controlling said tuner in a manner to enable said authorized user by entering commands on said remote control unit, to control allowance and blocking of viewing of one or more selected channels during a predetermined time period;

graphic display generating means in said controller unit operating in conjunction with a microcontroller enabling said authorized user to view time and channels displayed on the viewing screen as a two-dimensional matrix of set-up cells, said microprocessor and said remote control unit being made able to display in each cell a symbol indicating a commanded action chosen from a group including blocking, clearing or VCR recording and enabling a selected channel for a predetermined time interval.

2. A method for video viewing supervision using a remote control unit and a controller unit, both with a keypad, used for supervising viewing of video on a video displaying device during a supervised viewing mode, said method comprising the steps of:

displaying a selection matrix on said video displaying device, said selection matrix having individual cells corresponding to time of the day and video tuning channel allowing a user to control viewing of selected time and channel;

transmitting supervision requests, said supervision requests being displayed on graphically displayed said selection matrix displayed on said video displaying device, said transmitting being performed by said remote control unit;

receiving supervision requests from said remote control unit as input through said graphically displayed selection matrix displayed on said video displaying device, said receiving being performed by said controller unit;

storing said supervision requests in said controller unit; and controlling viewing of said video displaying device when said controller unit is in said supervised viewing mode.

3. The method of claim 2 wherein said step of transmitting supervision requests comprises the step of transmitting supervision requests of blocking viewing of said video displaying device at one or more predetermined time, said supervision requests made by blocking out said individual cells corresponding to one or more time at which viewing is to be blocked.

4. The method of claim 2 wherein said step of transmitting supervision requests comprises the step of transmitting supervision requests of blocking viewing of said video displaying device on one or more predetermined channel, said supervision requests made by blocking out said individual cells corresponding to one or more channel on which viewing is to be blocked.

5. The method of claim 2 wherein said step of displaying further comprises the step of storing screen displays having said selection matrix, said storing performed by a storage device in said controller unit.

6. The method of claim 2 wherein said step of displaying further comprises the step of storing commands corresponding to various user commands, said commands issued by a microprocessor in said controller unit, said commands being issued to a graphic generating means in said controller unit, said storing performed by a second storage device in said controller unit.

7. The method of claim 2 wherein said step of displaying further comprises the step of issuing said commands to retrieve said screen displays from said storage device, said retrieval performed by said graphic generating means.

8. The method of claim 2 wherein said step of controlling further comprises the steps of:

interrupting reception of video signal if said supervision requests is for blocking viewing, and if said video viewing device is set to a channel at a time for which blocking was requested in said supervision requests, said interrupting performed by a RF switch in said controller unit; and displaying a default screen stored in said storage device displaying a message indicating that viewing is being blocked.

9. The method of claim 2 wherein said step of controlling further comprises the steps of:

setting video viewing device to a channel requested in said supervision request at a requested time, if said supervision request is for showing a predetermined channel at a predetermined time, said setting performed by said controller unit; and blocking viewing of any other channels, said blocking performed by said control unit.

10. A video viewing supervision system, connected in combination with a video system including a viewing screen and video signal source means, for enabling an authorized user, to control viewing time of selected channels by another comprising:

an input means for accepting inputs of the commands from said user for the system;

a cable-compatible electrically controllable tuner receiving input from the signal source means;

a microprocessor controlling said tuner in a manner to enable said authorized user by entering commands on said input means, to control allowance and blocking of viewing of one or more selected channels during a predetermined time period;

graphic display generating means in said controller unit operating in conjunction with a microcontroller enabling said authorized user to view time and channels displayed on the viewing screen as a two-dimensional matrix of set-up cells, said microprocessor and said remote control unit being made able to display in each cell a symbol indicating a commanded action chosen from a group including blocking, clearing or VCR recording and enabling a selected channel for a predetermined time interval.

11. A method for video viewing supervision using a remote control unit and a controller unit, both with a keypad, used for supervising viewing of video on a video displaying device during a supervised viewing mode, said method comprising the steps of:

displaying a selection matrix on said video displaying device, said selection matrix having individual cells corresponding to time of the day and video tuning channel allowing a user to control viewing of selected time and channel;

transmitting supervision requests, said supervision requests being displayed on graphically displayed said selection matrix displayed on said video displaying device, said transmitting being performed through the keypad;

receiving supervision requests from the keypad as input through said graphically displayed selection matrix displayed on said video displaying device, said receiving being performed by said controller unit;

storing said supervision requests in said controller unit; and controlling viewing of said video displaying device when said controller unit is in said supervised viewing mode.

* * * * *

UNITED STATES PATENT AND TRADEMARK OFFICE
CERTIFICATE OF CORRECTION

PATENT NO. : 5,548,345
DATED : August 20, 1996
INVENTOR(S) : James M. Brian and Joseph N. Jackson It is certified that error appears in the above-identified patent and that said Letters Patent is hereby corrected as shown below:

Column 12, line 20:
    Delete "in said controller unit".

Column 12, line 25:
    Replace "remote control unit" with --input means--.

Column 12, lines 43-44:
    Replace "the keypad" with --one of said keypads--.

Signed and Sealed this

Eleventh Day of August 1998

*Attest:*

*Attesting Officer*

BRUCE LEHMAN

*Commissioner of Patents and Trademarks*

UNITED STATES PATENT AND TRADEMARK OFFICE
CERTIFICATE OF CORRECTION

PATENT NO. : 5,548,345
DATED : August 20, 1996
INVENTOR(S) : Brian et al.

It is certified that error appears in the above-identified patent and that said Letters Patent is hereby corrected as shown below:

In column 5 at line 49, please delete " 402. particular " and insert -- 402. In particular --.

Signed and Sealed this

Sixth Day of April, 1999

Attest:

Q. TODD DICKINSON

*Attesting Officer*    Acting Commissioner of Patents and Trademarks